UNITED STATES PATENT OFFICE.

FERDINANDO QUARTIERI, OF MILAN, ITALY.

PROCESS FOR THE MANUFACTURE OF TRINITROTOLUENE.

1,241,017. Specification of Letters Patent. Patented Sept. 25, 1917.

No Drawing. Application filed August 31, 1914. Serial No. 859,493.

*To all whom it may concern:*

Be it known that I, FERDINANDO QUARTIERI, engineer, subject of the King of Italy, resident of Milan, in the Kingdom of Italy, No. 17 Via Principe Umberto, have invented new and useful Improvements in Processes for the Manufacture of Trinitrotoluene, of which the following is a specification.

In the ordinary process of manufacturing trinitrotoluene, toluene is used as raw material and by suitable nitrations it is made into mononitro-, then into dinitro-, and finally into trinitrotoluene, or the mononitro product is transformed directly into trinitro-toluene, or the toluene may be transformed directly into dinitro-toluene and thereupon into trinitrotoluene. In all these various processes there is the drawback of an abundant formation of a liquid product which, if not removed, gives rise to an impure trinitrotoluene which must be crystallized from alcohol or other solvents in order to obtain it at the degree of purity required for the preparation of explosives.

According to the present invention the intermediate solid products obtained in nitrating toluene, such as impure or crude solid dinitrotoluene, for example, are submitted to a partial and fractional liquefaction, whereby pure dinitrotoluene and a liquid containing impurities are obtained. The pure dinitrotoluene thus separated is then heated gradually to 110° C. by addition of a nitric sulfuric mixture (containing from 20 to 30% of nitric acid) in the proportion of from 4 to 5 parts by weight of the mixture to one part by weight of dinitrotoluene. By slowly cooling the mass thus obtained, abundant crystallization of pure trinitrotoluene takes place which is washed with water and then melted in a vacuum to eliminate volatile impurities such as the acids. A pure product is thus obtained which after being granulated and dried, has an extremely high degree of solidification (namely about 80.5° C.) and has the same properties as that obtained by crystallization from volatile solvents.

The liquid containing impurities obtained during the purification of the raw dinitrotoluene, is separated from the mass and nitrated separately to obtain solid dinitrotoluene which in its turn can serve as the starting material for the production of pure trinitrotoluene as stated before.

What I claim and desire to secure by Letters Patent is:—

1. In the manufacture of trinitrotoluene, the process which comprises nitrating toluene, treating the solid intermediate products of the nitration to partially or fractionally liquefy the same and thereby to separate liquid intermediate nitration products therefrom, further nitrating the liquid intermediate nitration products thus separated, and purifying the resultant final product by melting and filtration, and by heating in a vacuum.

2. In the manufacture of trinitrotoluene, the process which comprises nitrating toluene, partially or fractionally liquefying solid intermediate products formed in the nitration, and separating and further nitrating the liquid intermediate products thus obtained.

3. In the manufacture of trinitrotoluene, the process which comprises nitrating toluene, partially or fractionally liquefying solid intermediate products formed in the nitration, separating the resultant liquid intermediate products from the remaining solid intermediate products, and further nitrating both the liquid and solid intermediate products thus separated.

In testimony whereof I hereunto affix my signature in the presence of two witnesses.

FERDINANDO QUARTIERI.

Witnesses:
B. CARLO TALVOTTI,
LYLE ROBB.